United States Patent
Lange

(10) Patent No.: US 10,854,934 B2
(45) Date of Patent: Dec. 1, 2020

(54) ENERGY STORAGE SYSTEM

(71) Applicant: enfas GmbH, Karlshuld (DE)

(72) Inventor: Falk Lange, Munich (DE)

(73) Assignee: enfas GmbH, Karlshuld (DE)

( * ) Notice: Subject to any disclaimer, the term of this patent is extended or adjusted under 35 U.S.C. 154(b) by 216 days.

(21) Appl. No.: 15/492,386

(22) Filed: Apr. 20, 2017

(65) Prior Publication Data

US 2017/0309974 A1 Oct. 26, 2017

(30) Foreign Application Priority Data

Apr. 21, 2016 (DE) .................. 10 2016 107 448

(51) Int. Cl.
| | |
|---|---|
| H01M 10/48 | (2006.01) |
| H02J 7/00 | (2006.01) |
| H01M 10/44 | (2006.01) |
| H01M 10/42 | (2006.01) |

(52) U.S. Cl.
CPC ..... *H01M 10/482* (2013.01); *H01M 10/4207* (2013.01); *H01M 10/44* (2013.01); *H01M 10/441* (2013.01); *H01M 10/486* (2013.01); *H02J 7/0014* (2013.01); *H02J 7/0021* (2013.01); *H02J 7/0024* (2013.01); *H02J 7/0026* (2013.01); *H01M 2010/4271* (2013.01); *H01M 2220/10* (2013.01)

(58) Field of Classification Search
CPC .... H01M 10/482; H01M 10/42; H01M 10/44; H01M 10/441; H01M 10/486; H01M 2010/4271; H01M 2220/10; H02J 7/0014; H02J 7/0021; H02J 7/0026; G01R 31/36
See application file for complete search history.

(56) References Cited

U.S. PATENT DOCUMENTS

| | | | |
|---|---|---|---|
| 5,656,915 A * | 8/1997 | Eaves ................. | H01M 10/482 320/118 |
| 6,229,283 B1 * | 5/2001 | Kalogeropoulos ... | H02J 7/0029 320/125 |
| 9,825,343 B2 * | 11/2017 | Obasih ............. | H01M 10/6562 |
| 2005/0017270 A1 | 1/2005 | King | |
| 2008/0136377 A1 | 6/2008 | Zhang | |

(Continued)

FOREIGN PATENT DOCUMENTS

| | | |
|---|---|---|
| CN | 103221835 A | 7/2013 |
| CN | 103430353 A | 12/2013 |

(Continued)

*Primary Examiner* — Nguyen Tran
*Assistant Examiner* — Paul D Baillargeon

(57) ABSTRACT

The invention relates to an energy storage system for a repeated drawing/intake, storage and release of electrical energy having a control unit and an energy store comprising a plurality of storage cells that are organized in storage modules, with the control unit being configured to separately determine the state of charge of at least some of the storage cells. The control unit is configured

Figure 1:
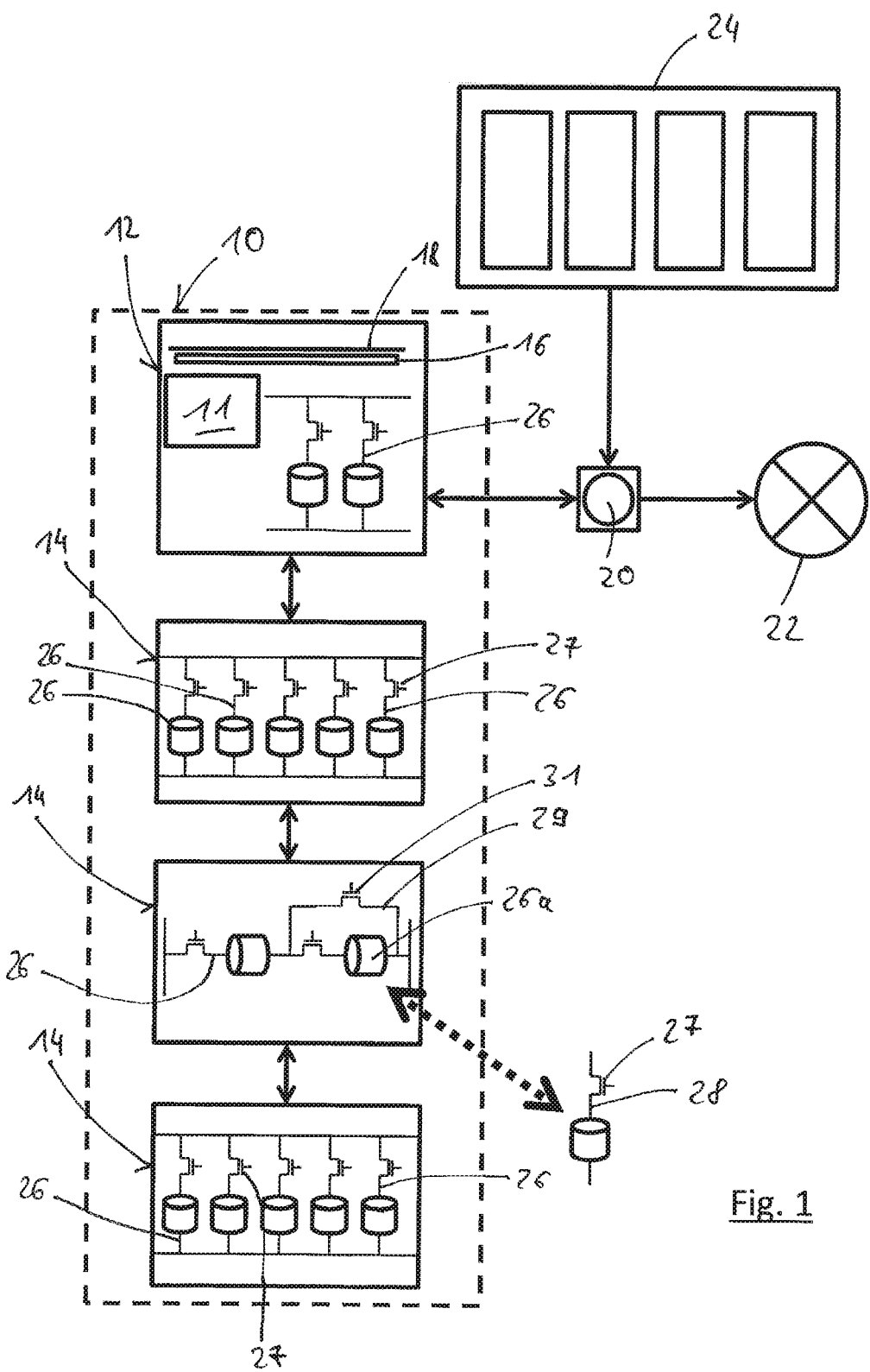

- to recognize whether at least one storage cell should be removed;
- to electrically disconnect the storage cell to be removed from the remaining storage cells after the recognition that at least one storage cell should be removed;
- to recognize whether the disconnected storage cell has been replaced by a new storage cell; and
- to electrically connect the new storage cell to the remaining storage cells.

17 Claims, 2 Drawing Sheets

(56) References Cited

U.S. PATENT DOCUMENTS

| | | | |
|---|---|---|---|
| 2009/0066291 A1* | 3/2009 | Tien | H02J 7/0016 |
| | | | 320/118 |
| 2011/0078470 A1* | 3/2011 | Wang | G06F 1/28 |
| | | | 713/320 |
| 2012/0268070 A1* | 10/2012 | Park | H01M 10/441 |
| | | | 320/126 |
| 2013/0113280 A1 | 5/2013 | Yang et al. | |
| 2013/0229152 A1* | 9/2013 | Kurimoto | B60K 1/04 |
| | | | 320/126 |
| 2013/0278218 A1* | 10/2013 | Onnerud | H01M 10/441 |
| | | | 320/118 |
| 2013/0302657 A1* | 11/2013 | Itakura | H02J 7/0065 |
| | | | 429/61 |
| 2014/0084870 A1* | 3/2014 | Castelaz | H02J 7/0019 |
| | | | 320/118 |
| 2014/0210415 A1 | 7/2014 | Ohmori | |
| 2016/0003911 A1 | 1/2016 | Lim et al. | |
| 2016/0093932 A1 | 3/2016 | Obasih et al. | |

FOREIGN PATENT DOCUMENTS

| | | |
|---|---|---|
| CN | 203377654 U | 1/2014 |
| CN | 104682511 A | 6/2015 |
| CN | 204407927 U | 6/2015 |
| DE | 102012203585 A1 | 9/2013 |
| DE | 102014215830 A1 | 2/2016 |

\* cited by examiner

ENERGY STORAGE SYSTEM

The present invention relates to an energy storage system for a repeated drawing/intake, storage and release of electrical energy. The energy storage system comprises a control unit and an energy store having a plurality of electrical storage cells that are organized in storage modules. The control unit is configured to determine the state of charge of at least some of the storage cells separately.

Such energy storage systems are generally known and are used, for example, for an intermediate storage of electrical energy generated by photovoltaic systems and for its later release as required. Such energy storage systems can in this respect in particular be used when no connection to a regular grid (island system) is present.

On the presence of a regular grid, energy storage systems can also serve to draw excess electrical energy of the grid and to release it again at times of large power requirements.

Electrical storage cells, which can be lithium-ion cells, for example, are provided in the energy storage systems of the category for storing the electrical energy. The storage cells can each be organized in storage modules that, for example, comprise 10 or 15 storage cells connected in parallel or in series and mechanically coupled. The storage cells can, however, also be electrically coupled inductively by means of coils, e.g. by means of electrical conductors.

The case can occur due to wear that individual storage cells of the energy store have to be replaced.

It is therefore the underlying object of the invention to provide an energy storage system that permits a simple replacement of storage cells in ongoing operation of the energy storage system.

This object is satisfied in accordance with the invention by an energy storage system in accordance with claim 1 and in particular in that the control unit is configured

- to recognize whether at least one storage cell should be removed;
- to electrically disconnect a storage cell to be removed from the remaining storage cells after the recognition that at least one storage cell should be removed;
- to recognize whether the disconnected storage cell has been replaced by a new storage cell; and
- to electrically connect the new storage cell to the remaining storage cells.

It is in particular made possible to remove storage cells in ongoing operation by the recognition that at least one storage cell should be removed and by the switching off of the storage cell following on from this since preferably only the storage cell (or e.g. its storage module) to be removed is switched off.

Since the newly inserted storage cell is only connected to the remaining storage cells when it has been recognized that the disconnected storage cell (or the disconnected storage cells) has (have) been replaced by a new storage cell, the new storage cell can be seamlessly integrated into the operation of the energy storage system. The disconnected storage cell can be the storage cell to be removed after its electrical disconnection.

The recognition whether the disconnected storage cell has been replaced by a new storage cell can take place, for example, in that the state of charge, the temperature and/or the internal resistance of the new storage cell differs from the removed storage cell. The new storage cell can be a storage cell that was previously not electrically integrated in the energy store. The new storage cell can accordingly also be a storage cell already used (elsewhere) or a newly produced storage cell. The control unit can in particular be configured in this respect to determine the state of charge of each individual storage cell of the energy store on its own (i.e. separately). The state of charge of each storage module can alternatively also be separately determined. The state of charge (SOC) can be given, for example, as a percentage or as a value in ampere hours (Ah). Additionally or alternatively, the state of health (SOH) of at least some of the individual storage cells or of the storage modules can also be determined. The SOH describes the capability of the storage cell or of the storage module to reach the required performance parameters. The SOH therefore designates the age state of the storage cell or storage module.

The recognition that a storage cell should be removed can take place, for example, by an input of the user at the energy storage system or can run automatically in that it is recognized whether a storage cell (e.g. with respect to SOC or SOH) delivers a poor performance or is even defective. The user can indicate in this respect which storage cell or which storage cells he would like to remove or replace. Alternatively or additionally, it can also be recognized whether a storage cell or a storage module is to be removed via a switch at a housing opening that closes the energy store or with the aid of an interlock.

The replacement of a storage cell can be necessary, for example, when the storage cell is defective or when its storage capacity has greatly reduced. In such a case, the control unit can draw the user's attention to the defective or low storage cell, whereupon the user can indicate that the storage cell should be removed. The communication between the energy storage system and the user can take place, for example, by means of a touch-sensitive display. Alternatively, the control unit can also automatically disconnect a defective or low storage cell.

The storage cell (or e.g. also a whole storage module) is subsequently electrically disconnected from the remaining storage cells (that is from the storage cells not to be removed). Due to the disconnection, the storage cell to be removed is no longer a component of the energy store, whereby the storage cell to be removed can substantially no longer release or draw any electrical power. The power and/or the voltage of the energy store can be reduced after the disconnection of the storage cell to be removed.

The operation of the energy storage system preferably also continues directly after and also during the disconnection of the storage cell to be removed. The energy storage system is therefore also able to draw, store and release energy after the disconnection and also during the disconnection.

The storage cell can then be removed and/or replaced after the disconnection. The control unit or the energy storage system can in particular be configured to permit a removal of the storage cell now electrically disconnected. This can take place, for example, by mechanical measures and by the release by means of a signal lamp and the like.

A removal of the storage cell is generally to be understood as a taking out of the storage cell from the energy storage system. However, for example, only a disconnection of the storage cell (but the mechanical remaining of the storage cell in the energy storage system) can also be considered as a removal in the sense of the present disclosure.

The storage cell to be replaced can then be mechanically removed from the energy store and can be replaced by a new storage cell. The new storage cell can in particular be connected to a line that permits the control unit to determine the state of charge of the new storage cell. A data communication can take place via the line e.g. by means of power line transmission (PLT) or power line communication (PLC), with the storage cell, for example, communicating its state of charge to the control unit. For this purpose, at least some of the storage cells can have sensors for detecting the state of charge and/or the SOH. The control unit can hereby determine that the disconnected storage cell has been replaced by a new storage cell and can electrically connect the new storage cell to the remaining storage cells.

The line connected to the new storage cell can be a balancing line that can also serve to charge and discharge the new storage cell.

All the storage cells (and thus also the new storage cell) can typically be generally identical storage cells. The storage cells can thus have the same specifications with respect to size, capacity, rated voltage and/or internal resistance.

An electrical connection is generally considered as a connection that transmits electrical power. An electrical connection can consequently be an electrically conductive connection, an inductive connection and/or a capacitive connection, but also a DC/DC converter and the like.

In addition to the change of the state of charge, the control unit can also be configured to determine the voltage, the temperature and/or the internal resistance of the storage cells and thus also of the new storage cell. Whether a new storage cell has been inserted into the energy store can then likewise be determined with reference to changes of voltage, of temperature and/or of the internal resistance.

The energy storage system can have a modular design and can, for example, comprise a converter unit that connects the energy storage system to a grid connection, in particular to an AC grid connection. The converter unit can serve to charge the energy store with electrical energy from the grid connection and to feed electrical energy of the energy tore into the grid connection. Alternatively or additionally, the energy storage system can also be connected to a DC grid with a voltage of e.g. 12 V. 24 V, 48 V or 400 V.

The energy store itself can have a modular design and can, for example, comprise a plurality of energy storage modules that are each connected to the converter unit. Each energy storage module can in this respect have its own energy store having a plurality of storage cells.

It is understood that the described procedure for removing and replacing a storage cell can be applied accordingly to the replacement (i.e. the removal and swapping) of whole storage modules or of whole energy storage modules. For example, on the replacement of a storage module (i.e. on the simultaneous replacement of a plurality of storage cells), it can likewise be recognized that the storage module is to be removed. After the recognition that the storage module should be removed, the storage module to be removed can be electrically disconnected from the remaining storage modules. It can subsequently be recognized whether the disconnected storage module was replaced by a new storage module, with the new storage module then being electrically connected to the remaining storage cells.

The embodiments described in the following are also respectively applicable to individual storage cells, storage modules of a plurality of storage cells or whole energy storage modules having a plurality of storage modules.

Advantageous further developments of the invention can be seen from the description, from the drawings and from the dependent claims.

In accordance with a first advantageous embodiment, the control unit is configured to adapt the state of charge of the new storage cell to the state of charge of the remaining storage cells before or on the electrical connection of the new storage cell to the remaining storage cells.

Alternatively or additionally, the control unit can be configured to adapt the state of charge of the remaining storage cells to the state of charge of the new storage cell before or on the electrical connection of the electrical storage cell to the remaining storage cells.

An adaptation of the states of change to one another serves to avoid too high a compensating current on the electrical connection of the new storage cell to the remaining storage cells in order not to damage the storage cells. The maximum permitted compensating current can be determined, for example, using parameters of the storage cells.

If there is therefore a different state of charge in comparison with the remaining storage cells, the state of charge of the new storage cell can be adapted to the state of charge of the remaining storage cells. Alternatively, the state of charge of the remaining storage cells can also be brought to the level of the state of charge of the new storage cell. It is likewise possible that both the state of charge of the new storage cell and the state of charge of the remaining storage cells are adapted to one another, that is the states of charge move toward one another. The adaptation preferably takes place such that after the adaptation the state of charge of the new storage cell and the state of charge of the remaining storage cells are the same or differ by less than a predefined limit value. The limit value can e.g. amount to three or five percentage points of the state of charge.

The adaptation of the state of charge can take place by a discharge of the respective storage cell, for example. This procedure can in particular be used when the new storage cell has a state of charge that is slightly larger than the state of charge of the remaining storage cells. In this respect, the new storage cell can then be discharged until the state of charge of the new storage cell corresponds to the state of charge of the remaining storage cells.

It is likewise possible to carry out the adaptation by charging the new storage cell or the remaining storage cells. Charging e.g. takes place in this respect for so long until the state of charge of the new storage cell and the state of charge of the remaining storage cells are the same.

If both the state of charge of the new storage cell and the state of charge of the remaining storage cells are adapted, the new storage cell can be discharged, for example, and the remaining storage cells can simultaneously be charged in order to achieve an adaptation as fast as possible. Alternatively, a charge of the new storage cell and simultaneously a discharge of the remaining storage cells can also take place.

Additionally or alternatively to the state of charge, further parameters can also be adapted to one another, for example the temperature and/or the voltage of the storage cells.

The energy storage system can, for example, comprise a discharge resistor to reduce the electrical energy for the discharge. The discharge resistor can e.g. be connected to the new storage cell by means of a switching matrix.

To adapt the state of charge, the individual storage cells can at least partly also be respectively electrically connected to the remaining storage cells by means of an adaptation switching element. Only the new storage cell can likewise e.g. also be electrically connected to the remaining storage cells by means of an adaptation switching element. Consequently, only a single adaptation switching element has to be stored that is e.g. respectively electrically connected to the new storage cell via a switching matrix.

The adaptation switching element can e.g. comprise a transistor (MOSFET), a DC/DC converter, a resistor and the like. To adapt the state of charge, the adaptation switching element can be controlled such that it limits a compensating current between the new storage cell and the remaining storage cells, for example by a high internal resistance or by a limited current flow by a DC/DC converter. Damage to or an overload of the storage cells can be prevented in this manner. An adaptation of the state of charge of the new storage cell and of the remaining storage cells to one another can take place by the compensating current. The new storage cell can release electrical energy to the energy store or draw energy from the energy store by the adaptation switching element.

The adaptation switching element can be configured, for example, to lead off a maximum dissipation loss of 6 watts. The compensating current can be limited such that the adaptation switching element is not overloaded. Additionally or alternatively, the compensating current can be set such that the new storage cell is charged or discharged at a maximum of 2 C (i.e. at a current that would fully charge or discharge the storage cell in 30 minutes).

In accordance with a further advantageous embodiment, the control unit is configured to set the speed of the adaptation of the state of charge in dependence on the dissipation loss arising during the adaptation. For this purpose, the adaptation switching element can e.g. be controlled accordingly, in particular by a suitable selection of a gate voltage of a MOSFET, to set a suitable internal resistance of the adaptation switching element. Heat is created in the storage cells and in the associated wiring both during the charging and the discharging of the storage cells (or of the total energy store). In addition, heat can arise at the discharge resistor, for example, during the discharging. To avoid any overheating of the energy storage system, the speed of the adaptation of the state of charge can be variable, for example by a variable discharge resistance.

The control unit is in particular configured to determine an instantaneously currently led off dissipation loss of the energy storage system and to select the speed of the adaptation of the state of charge such that a maximum dissipation loss of the energy storage system that can be led off is not exceeded.

The currently instantaneously led off dissipation loss can be determined, for example, via a temperature sensor at a cooling surface of the energy storage system. In addition to the temperature sensor on the cooling surface, a temperature sensor can also be provided that measures an environmental temperature of the energy storage system. The maximum dissipation loss that can be led off can be determined using the difference between the temperature of the cooling surface and the environmental temperature. In addition, the storage cells can have a sensor system for the temperature detection and means for transmitting the temperature to the control unit. Temperature limits can likewise be fixed that e.g. may not be exceeded at the cooling surface or in the storage cells.

Alternatively, the maximum dissipation loss that can be led off can also be a predefined value that is configured such that an overheating of the energy storage system is avoided. The dissipation loss and/or the maximum dissipation loss that can be led off can also be locally determined in dependence on the position of the new storage cell. This means that the dissipation loss and/or the maximum dissipation loss that can be led off are determined in the region of the energy store in which the new storage cell is arranged. Such a procedure can in particular be preferred with modular energy storage systems or with energy storage systems having a large spatial extent.

In this respect, the speed of the adaptation of the state of charge is to be understood as the change of the state of charge per unit of time ($\Delta SOC/\Delta t$). Alternatively, the level of a charge/discharge current can also define the speed of the adaptation.

In accordance with a further advantageous embodiment, the control unit is determined to reduce the electrically released or drawn power of the energy storage system, in particular to below a predefined threshold value, before the disconnection of the storage cell to be removed. The power released or drawn from the energy storage system (i.e. the system power) is the electrical power at a respective time that is drawn or released from the energy storage system. It can, on the one hand, be avoided by the reduction of the electrically released or drawn power that the remaining storage cells are overloaded after the removal of a storage cell. The advantage can result, on the other and, that the dissipation loss of the energy storage system is reduced, whereby a faster adaptation to the new storage cell can take place.

In accordance with a further advantageous embodiment, the energy storage system is only passively cooled. This means that no electrical energy is expended for the cooling of the energy storage system. The energy storage system therefore in particular comprises no fans, no cooling units or the like. A noise development of the energy storage system can advantageously be greatly reduced by an only passively cooled energy storage system, whereby it can also be installed e.g. in living rooms.

The energy storage system can preferably be configured for connection to a 230 volt or 110 volt grid and can in particular have a scalable maximum system power.

In accordance with a further advantageous embodiment, the control unit is configured to determine a temporal operating pattern of the energy storage system, wherein in particular the input power, the output power and/or the state of charge of the storage cells are determined over time for the operating pattern. The operating pattern can comprise statistics on the times at which and on the probability with which the energy store is charged or discharged.

The statistics of the operating pattern can preferably indicate the times in the future at which and the probability with which a respective state of charge of the energy store is present and whether a discharge or a charge of the energy store takes place at these times.

An adaptation of the new storage cell or of the remaining storage cells can be optimized on the basis of the temporal operating pattern and/or on the basis of the statistics since, for example, an adaptation (e.g. a discharge) of the new storage cell can be omitted when it is foreseeable that the remaining storage cells will reach the state of charge of the new storage cell with a high probability within a predetermined time span.

In more precise terms, an adaptation and in particular a discharge of the new storage cell can e.g. be omitted when it is to be expected with reference to the operating pattern that the energy store will discharge further and will thus adapt to the state of charge of the new storage cell "on its own". This can, for example, be the case when the energy storage system is used together with a photovoltaic system and the energy storage system is discharged every day when it is dark.

The control unit can generally be configured to define a maximum adaptation time period and/or a minimal adaptation probability, wherein initially no adaptation of the new storage cell or of the remaining storage cells takes place when it can be foreseen on the basis of the temporal operating pattern that the state of charge of the new storage cell and of the remaining storage cells will be substantially the same with a probability above the minimal adaptation probability within the maximum adaptation time period.

A maximum adaptation time period of five hours and a minimal adaptation probability of 50% can in particular be predefined by a user. If it can be seen from the statistics after the insertion of the new storage cell that the state of charge of the energy store will correspond to the state of charge of the new storage cell with a probability of more than 50% within the next five hours, no adaptation is first carried out. If it occurs after three hours, for example, that the states of charge are the same, the new storage cell will be electrically connected to the remaining storage cells without adaptation (that is then not necessary). If states of charge that are not the same are present within five hours, the adaptation is started at the end of the five hours. This means that the adaptation is started after the end of the maximum adaptation time period, e.g. by a corresponding control of the adaptation switching element, provided that the new storage cell is then not yet electrically connected to the remaining storage cells.

The operating pattern can also be used on the disconnection of the storage cell to be replaced to enable a disconnection with a predefined state of charge of the storage cell to be replaced without having to carry out a direct adaptation of the state of charge.

In accordance with a further advantageous embodiment, the control unit is configured to electrically disconnect the storage cell to be removed from the remaining storage cells when the storage cell to be removed has a predefined state of charge and/or when the energy storage system releases or draws less than a predefined electrical power. It can therefore be made possible to remove the storage cell to be removed at a predefined state of charge in order, for example, to carry out the storing of the storage cell to be removed at a state of charge ideal for the storing. Alternatively or additionally, the removal can take place when the energy storage system releases electrical power that is beneath a predefined limit power value in order also not to overload the remaining storage cells after the removal of the storage cell to be removed.

The disconnection can preferably take place within a time period that is shorter than a predefined disconnection time. The disconnection can alternatively take place independently of the operating state and/or independently of the state of charge of the storage cells.

In accordance with a further advantageous embodiment, at least one reserve storage cell is provided in the energy storage system that replaces the disconnected storage cell. The mechanical insertion of a new storage cell can be omitted due to the keeping in store of reserve storage cells, whereby the replacement of storage cells is simplified. In addition, a removal of the disconnected storage cell can be superfluous, whereby the replacement of a defective storage cell can take place fully automatically.

In accordance with a further advantageous embodiment, at least some of the storage cells are connected in series, with the storage cell to be removed being bridged by a means of a bypass line after the disconnection of the storage cell to be removed and with the bypass line preferably having the same resistance as the storage cell to be removed.

The function of the storage module can be maintained by the bypass line, with the electrical properties of the storage module being maintained as much as possible by the resistance of the bypass line. The bypass line can comprise a semiconductor switch, for example a MOSFET (metal oxide semiconductor field effect transistor), with the semiconductor switch being controlled such that the semiconductor switch adopts the resistance of the removed storage cell. The resistance of the removed storage cell can also be dynamically mapped by the bypass line. The resistance be set in dependence on the respective operating state (i.e. in dependence on the temperature, the load, etc.) for this purpose.

Alternatively, the bypass line can also have a resistance of substantially zero ohms or the behavior of a storage cell can be simulated by means of the bypass line, for example by changing resistances.

In accordance with an alternative embodiment, the storage cells are connected in parallel. No bypass line is necessary on the removal of a storage cell with a parallel circuit. With a parallel circuit, the maximum power to be removed from a storage module or from the energy store can drop so that the system power is preferably reduced before the removal of the storage cell.

In accordance with a further advantageous embodiment, the storage cell to be removed and/or the new storage cell can be disconnected from the remaining storage cells by means of an electrical switching element and can be connected to the remaining storage cells. The electrical switching element can be controllable by the control unit. The switching element can in particular be the adaptation switching element. In addition, all or at least some storage cells can respectively comprise their own switching element. Alternatively, a respective storage module can have its own switching element to electrically disconnect the total storage module from the remaining storage cells.

The electrical switching element preferably comprises a semiconductor switch (in particular a MOSFET) and/or an ohmic resistor and/or a DC/DC converter and/or two inductively coupled coils, with a separate electrical switching element preferably being associated with each storage cell.

The semiconductor switch can be configured such that it can be bidirectionally conductively switched. Two transistors can be provided for this purpose, for example. The DC/DC converter can be a bidirectional or a unidirectional DC/DC converter. If an inductive electrical connection by means of two inductively coupled coils is provided, a separate primary coil and a separate secondary coil can e.g. be associated with each storage cell. Alternatively, a single primary coil can be provided for a plurality of storage cells or for all storage cells, with the primary coil being inductively coupled to respective separate secondary coils. The separate secondary coils can each be associated with an individual storage cell.

A further subject of the invention is a method of replacing a storage cell of an energy storage system, wherein the energy storage system comprises an energy store having a plurality of electrical storage cells that are organized in storage modules, wherein it is recognized whether at least one storage cell should be removed;

the storage cell to be removed is electrically disconnected from the remaining storage cells after the recognition that at least one storage cell should be removed;

it is recognized whether the disconnected storage cell has been replaced by a new storage cell; and the new storage cell is electrically connected to the remaining storage cells.

The statements with respect to the energy storage system in accordance with the invention, in particular with respect to advantages and preferred embodiments, apply accordingly to the method in accordance with the invention.

The invention further relates to a further energy storage system for a repeated intake/drawing, storage and release of electrical energy having a control unit and an energy store comprising a plurality of electrical storage cells that are organized in storage modules, with the control unit being configured to separately determine the state of charge of at least some of the storage cells. The energy storage system is characterized in that the control unit is configured to recognize whether a new storage cell should be added to the energy store;

to electrically connect the new storage cell to the remaining storage cells; and to adapt the state of charge of the new storage cell to the state of charge of the remaining storage cells and/or to adapt the state of charge of the remaining storage cells to the state of charge of the new storage cell before or on the electrical connection of the new storage cell to the remaining storage cells.

It is thus possible with the further energy storage system in accordance with the invention to integrate additional storage cells into the energy store or to add them to the energy store in ongoing operation. The performance of the energy storage system can be increased in operation in this manner.

The statements with respect to the adaptation and integration of new storage cells and with respect to operating strategies for the adaptation and integration of new storage cells apply accordingly to the further energy storage system.

The invention will be described in the following purely by way of example with reference to the drawings. There are shown:

FIG. 1 an energy storage system; and

Figure 2:
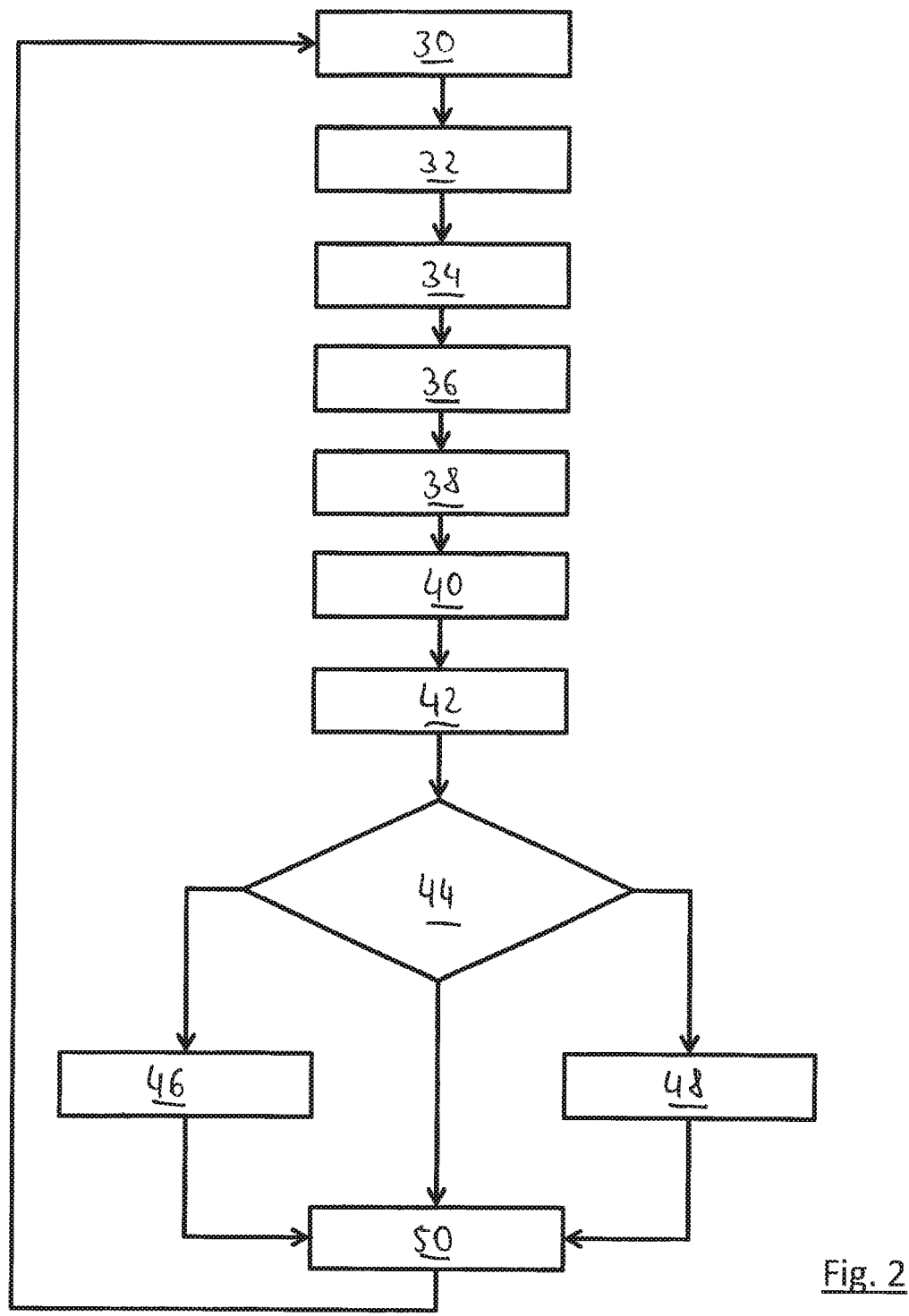

FIG. 2 a flowchart for the replacement of storage cell of the energy storage system.

FIG. 1 shows an energy storage system 10. The energy storage system 10 comprises a control unit 11 that is arranged in a converter unit 12 and three storage modules 14.

The converter unit 12 comprises a converter 16 as well as a cooling surface 18 that passively leads off the waste heat of the energy storage system 10. The converter unit 12 is electrically connected to the storage modules 14.

The energy storage system 10 and in particular the converter unit 12 are coupled to a grid 20, with a consumer 22 and a photovoltaic system 24 additionally being connected to the grid 20 (via an inverter, not shown). The grid 20 supplies AC voltage.

The energy storage system 10 can form, together with the photovoltaic system 24, a so-called island system that does not receive any further electrical energy supplied from the outside.

The converter unit 12 and the storage modules 14 each have a plurality of identical storage cells 26. The storage cells 26 each comprise an electrical switching element 27 in the form of a MOSFET that also serves as an adaptation switching element. The storage cells 26 in two of the storage modules 14 are each connected in parallel. The storage cells 26 in one of the storage modules 14 are connected in series.

In the operation of the energy storage system 10, electrical energy generated by the photovoltaic system 24 is converted into DC current by means of the converter unit 12 such that the electrical energy can be stored in the storage modules 14.

For example, when it is dark, electrical energy stored in the storage cells 26 is converted by the converter 16 such that the electrical energy can be fed into the grid 20 and can be used by the consumer 22. The converter 16 can, for example, generate AC current having a frequency of 50 Hz and a voltage of 230 volts for this purpose.

A new storage cell 28 is shown in FIG. 1 that is intended to replace one of the storage cells 26 connected in series from one of the storage modules 14. The storage cell to be replaced is marked by the reference numeral 26a. The storage cell 26a is bridged by a bypass line 29 using a bypass transistor 31 during the replacement of the storage cell 26a to be replaced.

The process of replacing the storage cell 26a with the new storage cell 28 is shown schematically in FIG. 2.

A regular operation of the energy storage system 10 is assumed in the block 30. It is determined in the block 32 that the storage cell 26a to be replaced is defective. This is communicated to a user.

The user thereupon advises the energy storage system 10 in block 34 via touch display (not shown) that he would like to replace the defective storage cell 26a with the new storage cell 28. The control unit 11 of the energy storage system 10 thereupon disconnects the defective storage system 26a from the remaining storage cells 26 in block 36 and advises the user of this.

In block 38, the defective storage cell 26a is removed through a service opening and in block 40 the new storage cell 28 is inserted into the energy storage system 10.

In block 42, the state of charge of the new storage cell 28 and also of the remaining storage cells 26 is detected. Depending on the states of charge, a decision is made in block 44 whether a charge or discharge of the new storage cell 28 or of the remaining storage cells 26 is required. Operation thus continues with block 46 if the state of charge of the new storage cell 28 is higher than the state of charge of the remaining storage cells 26 (i.e. if the new storage cell 28 has a higher charge than the remaining storage cells 26). In this case, the new storage cell 28 is discharged and at the same time the remaining storage cells 26 are charged until the state of charge of the new storage cell 28 and of the remaining storage cells 26 is the same.

If the state of charge of the new storage cell 28 is smaller than that of the remaining storage cells 26, operation continues with block 48. In block 48, the new storage cell 28 is charged and at the same time the remaining storage cells 26 are discharged until the states of charge of the cells 26, 28 are identical.

The charging and discharging in the blocks 46 and 48 respectively takes place by a compensating current (for example U charge or I charge) that is set by the electrical switching element 27 of the new storage cell 28.

The discharge takes place in both cases such that the heat arising on the discharge can be led off via the cooling surface 18 with an only passive cooling.

If the states of charge of the new storage cell 28 and of the remaining storage cells 26 are already identical on the insertion of the new storage cell 28, operation immediately continues with block 50 in which an electrical connection of the new storage cell 28 is established to the remaining storage cells 26. Subsequently, operation continues with the regular operation of the energy storage system 10 in block 30.

It is understood that in block 44 different operating strategies for adapting the states of charge (such as described above) can also be selected.

REFERENCE NUMERAL LIST 10 energy storage system
11 control unit
12 converter unit
14 storage module
16 converter
18 cooling surface
20 grid 22 consumer
24 photovoltaic system
26 storage cell
26a storage cell to be removed
27 electrical switching element
28 new storage cell
29 bypass line
3 regular operation
31 bypass transistor
32 defective storage cell
34 initiate replacement
36 disconnect storage cell
38 remove storage cell
40 insert storage cell
42 check states of charge
44 decision block
46 adapt states of charge
48 adapt states of charge
50 electrically connect the storage cell

The invention claimed is:

1. An energy storage system for a repeated intake, storage and release of electrical energy, the energy storage system comprising
a control unit and an energy store comprising a plurality of electrical storage cells that are organized in storage modules, wherein the control unit is configured to separately determine a state of charge of at least some of the storage cells,
wherein the control unit is further configured
to recognize whether at least one storage cell should be removed;
to electrically disconnect the storage cell to be removed from the remaining storage cells after the recognition that at least one storage cell should be removed;
to recognize whether the disconnected storage cell has been replaced by a new storage cell; and
to electrically connect the new storage cell to the remaining storage cells;
wherein the control unit is configured to determine a temporal operating pattern of the energy storage system; and
wherein the temporal operating pattern comprises statistics, with the statistics of the temporal operating pattern indicating future times at which and a probability with which a respective state of charge of the energy store is present and whether a discharge or a charge of the energy store takes place at these times.

2. The energy storage system in accordance with claim 1, wherein the control unit is configured to define a maximum adaptation time period and/or a minimal adaptation probability, wherein initially no adaptation of the new storage cell and/or of the remaining storage cells takes place when it can be foreseen on a basis of the temporal operating pattern that the state of charge of the new storage cell and of the remaining storage cells will be substantially the same with a probability above the minimal adaptation probability within the maximum adaptation time period.

3. The energy storage system in accordance with claim 1, wherein the control unit is configured to electrically disconnect the storage cell to be removed from the remaining storage cells when the storage cell to be removed has a predefined state of charge and/or when the energy storage system releases or draws a predefined electrical power.

4. The energy storage system in accordance with claim 1, wherein a reserve storage cell is provided in the energy storage system that replaces the disconnected storage cell.

5. The energy storage system in accordance with claim 1, wherein at least some of the storage cells are connected in series, with the storage cell to be removed being bridged by means of a bypass line after the disconnection of the storage cell to be removed.

6. The energy storage system in accordance with claim 1, wherein at least some of the storage cells are electrically connected to the remaining storage cells in each case by means of an adaptation switching element to adapt the state of charge.

7. The energy storage system in accordance with claim 1, wherein the control unit is configured to determine a currently led off dissipation loss of the energy storage system and to select the speed of the adaptation of the state of charge such that a maximum dissipation loss of the energy storage system that can be led off is not exceeded.

8. The energy storage system in accordance with claim 1, wherein the control unit is configured to reduce electrically released or drawn power of the energy storage system before the disconnection of the storage cell to be removed.

9. The energy storage system in accordance with claim 8, wherein the control unit is configured to reduce electrically released or drawn power of the energy storage system to below a predefined threshold value.

10. The energy storage system in accordance with claim 1, wherein the energy storage system is only passively cooled.

11. The energy storage system in accordance with claim 1, wherein the control unit is configured to determine a temporal operating pattern of the energy storage system.

12. The energy storage system in accordance with claim 11, wherein at least one of an input power, an output power and the state of charge of the storage cells is determined over time for the temporal operating pattern.

13. An energy storage system for a repeated intake, storage and release of electrical energy, the energy storage system comprising
a control unit and an energy store comprising a plurality of electrical storage cells that are organized in storage modules, wherein the control unit is configured to separately determine a state of charge of at least some of the storage cells,
wherein the control unit is further configured
to recognize whether at least one storage cell should be removed;
to electrically disconnect the storage cell to be removed from the remaining storage cells after the recognition that at least one storage cell should be removed;
to recognize whether the disconnected storage cell has been replaced by a new storage cell; and
to electrically connect the new storage cell to the remaining storage cells;
wherein at least some of the storage cells are connected in series, with the storage cell to be removed being bridged by means of a bypass line after the disconnection of the storage cell to be removed; and
wherein the bypass line has the same resistance as the storage cell to be removed.

14. The energy storage system in accordance with claim 13,
wherein the storage cell to be removed and/or the new storage cell can be disconnected from the remaining storage cells and can be connected to the remaining storage cells by means of an electrical switching element.

15. The energy storage system in accordance with claim 14,
wherein at least some of the storage cells comprise their own switching element.

16. The energy storage system in accordance with claim 14,
wherein said electrical switching element comprises at least one of a semiconductor switch, an ohmic resistor, a DC/DC converter and two inductively coupled coils.

17. The energy storage system in accordance with claim 16,
wherein a separate electrical switching element is associated with each storage cell.

* * * * *